Oct. 9, 1962 — T. F. W. MEYER — 3,056,985
ROD WIPER CONSTRUCTION
Filed Aug. 4, 1959 — 2 Sheets-Sheet 1
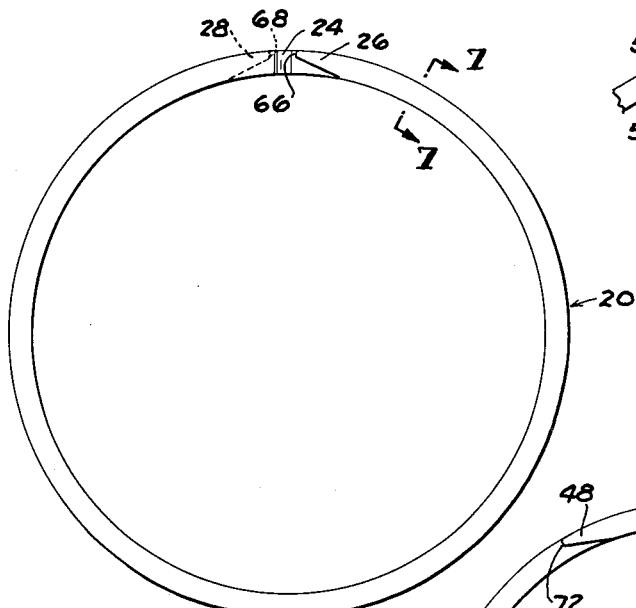
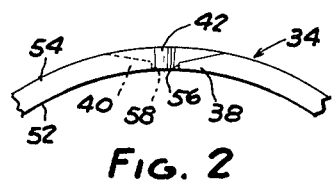
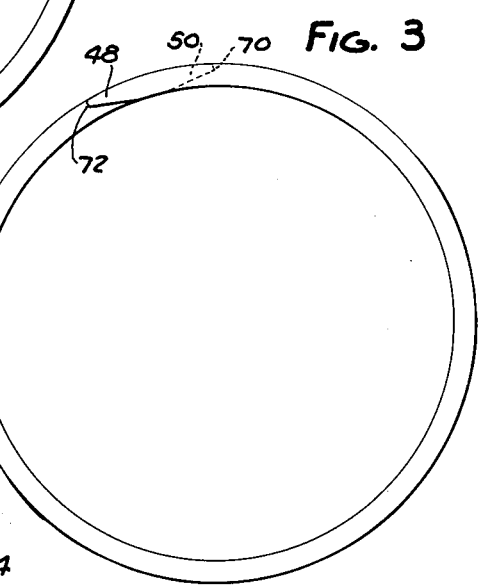
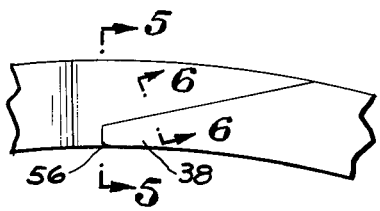
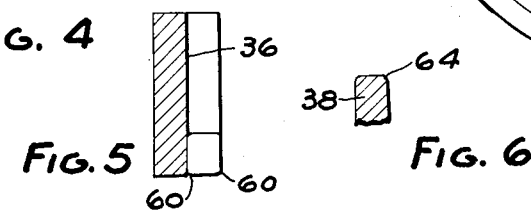
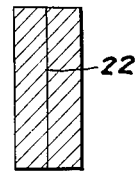
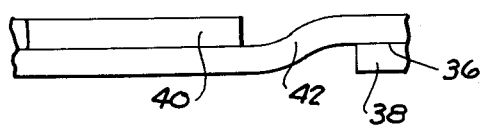
INVENTOR.
THEODORE F. W. MEYER
BY Barnes, Kisselle, Raisch & Choate
ATTORNEYS Oct. 9, 1962     T. F. W. MEYER     3,056,985

ROD WIPER CONSTRUCTION

Filed Aug. 4, 1959     2 Sheets-Sheet 2

INVENTOR.
THEODORE F. W. MEYER
BY
Barnes, Kisselle, Raisch & Choate
ATTORNEYS

United States Patent Office 3,056,985
Patented Oct. 9, 1962

3,056,985
ROD WIPER CONSTRUCTION
Theodore F. W. Meyer, Delray Beach, Fla., assignor to Equi-Flex Products, Incorporated, Detroit, Mich., a corporation of Michigan
Filed Aug. 4, 1959, Ser. No. 831,573
9 Claims. (Cl. 15—104.04)

This invention relates to rod or bore wipers or scrapers of the type using a strip of elastic material fashioned into a ring and having free ends so that the ring can be yieldably contracted or expanded to stressed condition and engaged in circumflexing wiping relation to a reciprocating rod or bore. Such a construction is disclosed in my co-pending application Serial No. 567,215 filed February 23, 1956, and entitled "Device for Wiping or Scraping a Working Member," now Patent No. 2,974,983 dated March 14, 1961.

The rings are usually applied to members having normal manufacturing tolerances so that frequently the rings are slightly larger or slightly smaller than the member being wiped. When a ring is contracted about a rod, for example, to obtain a good wiping contact, the free unsupported end portions of the ring bear inwardly against the rod with a greater force than intermediate portions of the ring and consequently tend to wear grooves in the rod. Moreover, the very ends of the rod tend to dig into the rod and progress axially intermittently thus chattering on the rod. When a ring is expanded about a slightly larger rod, the very end portions tend to retain their original smaller radius of curvature which also causes the end portions to bear inwardly with greater force against the rod than intermediate portions. This also tends to wear grooves in the rod and to produce chattering. A similar but inverse situation arises when a ring must be slightly contracted or expanded into wiping contact with a bore wall.

The object of this invention is to provide a simple inexpensive shaft wiping or scraping structure improved to eliminate uneven wear around the shaft and to eliminate chattering.

The invention generally contemplates radially thinning the end portions of the wiper ring by tapering them circumferentially so that they will more readily assume the general curvature of the shaft in stressed condition and will exert a shaftward force generally approximating that exerted by intermediate portions of the ring. The shaft-engaging portions of the ring immediately adjacent its very ends are slightly rounded to prevent these portions from digging into the shaft. Also, where an elastomer body is used to exert shaftward force on the ring, the taper end portions of the ring are out of contact with the elastomer body and are not subject to its shaftward force. One form of the invention is shown in the accompanying drawings.

FIG. 1 is an elevational view of a wiper ring according to this invention adapted for wiping a bore.

FIG. 2 is a fragmentary elevational view of a wiper ring adapted for wiping a rod.

FIG. 3 is an elevational view of a bore wiping ring similar to that of FIG. 1 except that it has only slightly more than one complete convolution.

FIG. 4 is an enlarged fragmentary elevational view illustrating structure at a free end portion of a wiper ring.

Figure 9:
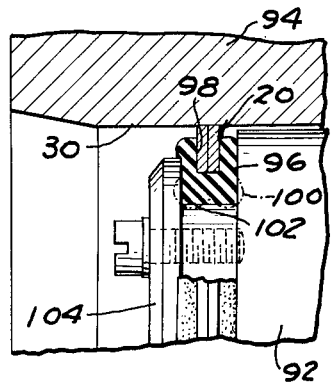

FIG. 5 is a sectional view on line 5—5 of FIG. 4.
FIG. 6 is a sectional view on line 6—6 of FIG. 4.
FIG. 7 is a sectional view on line 7—7 of FIG. 1.
FIG. 8 is an enlarged fragmentary top plan view of the rod wiper shown in FIG. 2.
FIG. 9 is an enlarged fragmentary sectional view illustrating a bore wiper in use.

Figure 10:
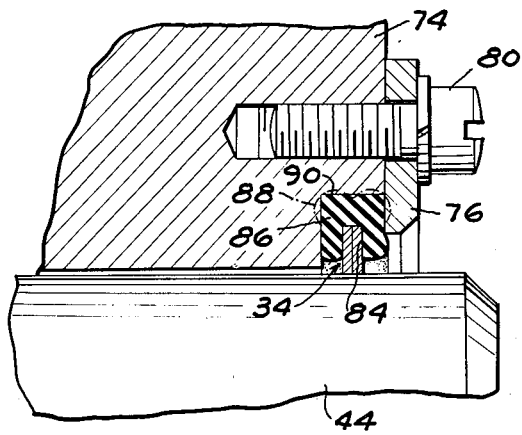
Figure 11:
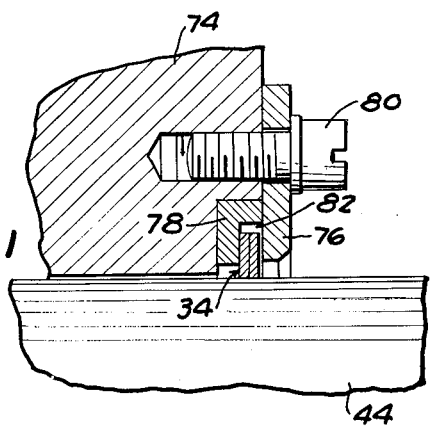
Figure 12:
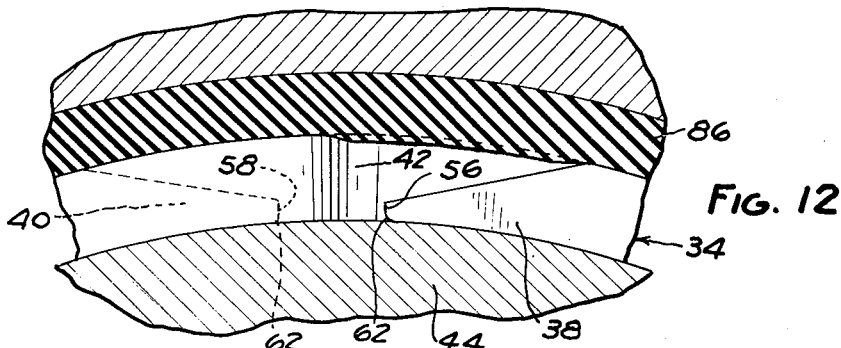

FIG. 10 is an enlarged fragmentary sectional view illustrating a rod wiper in use.
FIG. 11 is an enlarged fragmentary sectional view illustrating a shaft wiping ring in use without an elastomer body.
FIG. 12 is an enlarged partly diagrammatic sectional view illustrating structure of a shaft wiper adjacent the free ends of the wiping ring.

The term "shaft wiper" as used herein is intended to include both bore wipers and rod wipers.

Shown in FIG. 1 is a bore wiper 20 according to this invention formed by fashioning a strip of resiliently flexible material such as steel or a beryllium copper alloy into a two convolution helix with the side faces of the adjacent convolutions in interfacial engagement as illustrated at 22. The helix has a central laterally off-set portion 24 and the free end portions 26 and 28 of the strip are disposed generally adjacent the central portion. With this construction, the ring or annulus formed by the strip can be flexed radially inwardly or outwardly for circumflexing wiping engagement with the interior of a bore 30 (FIG. 9) to be wiped where the bore has a diameter slightly different from that of the wiper caused, for example, by ordinary manufacturing tolerances.

FIG. 2 illustrates a rod wiper 34 constructed in a generally similar manner having two convolutions interfacing at 36 and having free end portions 38 and 40 disposed adjacent a central off-set 42. This wiper is also radially resiliently expansible or contractable for circumflexing wiping engagement around a rod 44 (FIGS. 10 and 11).

Another form of bore wiper 46 is illustrated in FIG. 3 and this wiper essentially comprises a single convolution of the strip stock having end portions 48 and 50 which are overlapped to form a complete ring. This wiper also can be resiliently contracted or expanded radially for wiping engagement with a bore 30.

It will be understood that rod wiper 34 may be made with slightly more than one complete convolution as is bore wiper 46.

Shaft wipers 20, 34 and 46 have a common construction at their respective free end portions. For convenience, this construction will be discussed with reference to rod wiper 34. Wiper 34 has a generally uniform radial thickness between its inner rod wiping surface 52 and its outer peripheral surface 54. However, end portions 38 and 40 are tapered radially inwardly so that the radial thickness of the end portions decreases toward their very ends 56 and 58 respectively. With this construction the shaftward force exerted by the end portions of the ring decreases toward the extreme ends of the strip material forming the wiper ring. In addition, the corners between rod wiping surface 52 and the sides and extreme end of the ring are slightly relieved as at 60 (FIG. 5) and 62 (FIG. 12) on a rounded contour to facilitate smooth movement of the ring ends relative to rod 44. The top edges of the tapered ends are also preferably slightly rounded as at 64 (FIG. 6) for a purpose to be described. The rounding of edges 60, 62 and 64 may be accomplished by merely touching these edges with a grinding stone or the like.

The construction of the free ends of the bore wipers 20 and 46 is similar to that of the bore wiper except that in these cases the radial taper of the end portion is outward rather than inward.

In use, considering first rod wiper 34, it may be assumed that the rod wiper is mounted in a rod-surrounding member 74 (FIG. 11) by means of clamp elements 76 and 78 secured to member 74 by a screw 80 and defining a recess 82 within which the rod wiper is secured. Usually, because of ordinary manufacturing tolerances, rod 44 is either slightly larger or slightly smaller than the internal diameter of wiper 34. If the rod is larger so that wiper 34 must be expanded radially to a significant extent to engage around the rod, end portions 38 and 40 tend to retain their original relatively small radius of curvature since these end portions are free and are therefore unsupported. However, in accordance with the present invention, these end portions are tapered radially inwardly toward rod wiping surface 52. These portions thus have greater flexibility than other portions of the wiper strip stock and thus can be flexed relatively easily to a new larger radius of curvature. Moreover, these tapered portions exert a shaftward force which decreases toward their extreme ends. As a consequence, the tendency of the free ends to bear more heavily on rod 44 than intermediate portions of the wiper is greatly diminished or entirely eliminated and rod 44 is not grooved during the course of reciprocation relative to the wiper by the free ends of the wiper.

Lateral frictional force exerted by rod 44 on the wiper during the wiping tends to split the convolutions of the wiper apart and this tends to cause cocking of the free ends 38 and 40 of the wiper which in turn tends to cause the corners or extreme edges of the free ends to dig into the rod and move intermittently along the rod rather than continuously and smoothly. The rounding of the ends at 60 and 62 eliminates the tendency of the wiper ends to dig in and thus provides for smooth relative movement of the rod and wiper.

In some applications of the invention, a wiping force additional to that afforded by the resilient nature of the wiper ring itself is desired. Accordingly, as disclosed in my above mentioned pending application, the wiper ring is inserted within a groove 84 in a circular body of elastomer material 86 which is clamped to member 74 by a clamping element 76 through screw 80. The elastomer body in unstressed condition has protuberances 88 which are resiliently distorted into the confines of a groove 90 defined by clamp 76 and member 74 with a resultant radially inward force on wiper 34 which supplements the inward force of the wiper itself. If rod 44 should be slightly smaller than the inner diameter of the wiper ring, the ring contracts around the rod and this causes the unsupported free ends 38 and 40 of the wiper to collapse radially inwardly and bear heavily against the rod thus tending to groove the rod. However, the taper conformation of these ends diminishes their shaftward force and makes them more flexible in nature so that they bear against the rod with a force generally approximating that of the rest of the wiper. Thus, their tendency to groove the rod is greatly diminished or eliminated. Here again rounded edges 60 and 62 eliminate chattering.

The tapered ends provide a further function when the wiper ring is used with an elastomer body and this function is best understood from FIG. 12. It will be noted that the tapered surfaces of the free end portions of the wiper are spaced radially inwardly out of contact with the elastomer body so that these portions are free of the shaftward force of the resiliently stressed elastomer material and there is no tendency of the free ends to dig into or groove the rod. The rounded upper edges 64 of the tapered end portions of the wiper (FIG. 6) avoid any tendency of these surfaces to cut into the elastomer material.

Referring now to the use of bore wipers of FIGS. 1 and 3 it may be assumed that either of these wipers has been mounted on a member 92 reciprocating within an outer member 94 containing bore 30. The bore wiper similarly to the rod wiper may be used with or without an elastomer ring 96. If the elastomer is used, the wiper annulus is contained within a groove 98 in the body and protuberances 100 thereon are compressed into a recess 102 defined by a clamp element 104 and a portion of element 92. The elastomer body exerts radially outward force on the bore wiper.

If bore 30 has a slightly smaller diameter than the outer diameter of wiper 20 or 46, upon contraction of the wiper the unsupported free end portions thereof tend to retain their initial larger radius of curvature and thus tend to dig into and groove the bore. This tendency is diminished or eliminated by the tapered conformation of the end portions which makes them more flexible and reduces the force which they exert on the bore. Similarly, if the bore should be somewhat larger so that the wiper must be expanded and if the elastomer ring is employed for expanding the wiper, the unsupported free end portions tend to bear relatively heavily outwardly against the bore and groove it. Here again the taper conformation of the end portions minimizes or eliminates the tendency thereof to groove the bore. Also, the tapered portions of the wiper are spaced radially outwardly of adjacent portions of elastomer ring 92 and thus are free of the shaftward force of the elastomer. The corner edges of the end portions of bore wipers 20 and 46 are preferably rounded in a manner similar to edges 60 and 62 of rod wiper 34 so that they move smoothly over the bore surface. Also, the taper edges of these wipers if used with an elastomer ring are preferably rounded in a manner similar to the rounding of corners 64 in the rod wiper to avoid cutting the elastomer ring.

I claim:
1. A shaft scraper comprising, a length of flexible material formed into an annulus having more than one complete convolution and having free end portions so that said annulus can be resiliently radially expanded and contracted, said annulus having one peripheral surface extending angularly through at least substantially 360 degrees and being adapted to scrapingly engage a shaft surface when said annulus is mounted in circumflexing relation to the shaft, said surface being substantially flat in an axial direction, said annulus having a side face which intersects said surface at substantially right angles, said annulus having another peripheral surface and having a radial thickness between said surfaces, said other surface tapering radially toward said one surface adjacent said end portions so that the radial thickness of said end portions and shaftward force thereof decreases toward the very ends of said end portions, said one peripheral surface immediately adjacent said very ends being at least slightly relieved in a radial direction on a rounded contour to facilitate smooth movement of said very ends relative to said shaft.

2. A shaft scraper comprising, a length of flexible material formed into an annulus with free end portions so that said annulus can be resiliently radially expanded and contracted, said annulus having a peripheral shaft scraping surface which is substantially flat in an axial direction and which extends angularly through at least substantially 360 degrees, said annulus having a side face which intersects said scraping surface at a sharp angle to provide an annular scraping edge extending angularly through at least substantially 360 degrees, the material forming said annulus extending angularly beyond said 360 degrees and the portions thereof immediately adjacent its very ends being at least slightly relieved in a radial direction away from the shaft on a rounded contour to facilitate smooth movement of said very ends relative to said shaft, said annulus having another peripheral surface and having a radial thickness between said surfaces, said other surface tapering radially in a shaftward direction adjacent said end portions so that the radial thickness of said end portions and shaftward force thereof decreases toward said very ends of the annulus.

3. The combination defined in claim 2 wherein said annulus has its least radial thickness at said very ends.

4. The combination defined in claim 2 wherein said annulus has substantially uniform radial thickness between said tapered end portions.

5. In the combination of a rod or shaft reciprocable contiguous to a recessed element and a shaft scraper having an expansible free-ended annulus of at least substantially one complete convolution having one peripheral surface urged into scraping engagement with the shaft by a body of elastomer material disposed around the other peripheral surface and being axially compressed within the recess, the elastomer body and portions of the recess also supporting the annulus against axial deflection, improved shaft scraper construction wherein said annulus has a radial thickness between said surfaces, said other surface tapering radially toward said one surface adjacent the free end portions of said annulus so that the radial thickness of said end portions and the shaftward force thereof decreases toward the very ends of said end portions.

6. The combination defined in claim 5 wherein said one peripheral surface immediately adjacent said very ends is at least slightly relieved in a radial direction on a rounded contour to facilitate smooth movement of said very ends relative to said shaft.

7. The combination defined in claim 5 wherein said annulus has its least radial thickness adjacent said very ends.

8. The combination defined in claim 5 wherein said end portions are spaced from said body of elastomer material so that they are free of shaftward force of said body.

9. The combination defined in claim 5 wherein said annulus has side face portions which intersect said one surface at an angle of about 90° to provide annular scraping edge portions, said edge portions extending angularly through at least substantially one complete convolution.

References Cited in the file of this patent
UNITED STATES PATENTS

| | | |
|---|---|---|
| 1,411,244 | Ford | Mar. 28, 1922 |
| 2,368,380 | Ruzicka | Jan. 30, 1945 |
| 2,397,220 | Teetor | Mar. 26, 1946 |
| 2,566,448 | Heintz et al. | Sept. 4, 1951 |
| 2,713,522 | Petch | July 19, 1955 |
| 2,772,105 | Wyse | Nov. 27, 1956 |

FOREIGN PATENTS

| | | |
|---|---|---|
| 1,037,011 | France | Apr. 29, 1953 |